United States Patent
Smith et al.

(10) Patent No.: US 6,592,039 B1
(45) Date of Patent: Jul. 15, 2003

(54) DIGITAL PEN USING INTERFEROMETRY FOR RELATIVE AND ABSOLUTE PEN POSITION

(75) Inventors: Barton Allen Smith, Campbell, CA (US); Thomas Guthrie Zimmerman, Cupertino, CA (US)

(73) Assignee: International Business Machines Corporation, Armonk, NY (US)

(*) Notice: Subject to any disclaimer, the term of this patent is extended or adjusted under 35 U.S.C. 154(b) by 177 days.

(21) Appl. No.: 09/644,809

(22) Filed: Aug. 23, 2000

(51) Int. Cl.[7] .................................................. G06K 7/10
(52) U.S. Cl. .............................. 235/462.49; 235/462.03
(58) Field of Search ....................... 235/462.42, 462.43, 235/462.49, 472.01, 472.03; 178/18.01; 345/156, 158, 179; 382/120, 121, 123, 187, 188

(56) References Cited

U.S. PATENT DOCUMENTS

| | | | |
|---|---|---|---|
| 4,111,052 A | 9/1978 | Sniderman ............... 73/432 R |
| 4,513,437 A | 4/1985 | Chainer et al. ................. 382/3 |
| 5,018,208 A | 5/1991 | Gladstone ....................... 382/3 |
| 5,162,640 A * | 11/1992 | Ishikawa ............... 235/462.43 |
| 5,414,252 A | 5/1995 | Shinoda et al. ............. 235/463 |
| 5,587,558 A * | 12/1996 | Matsushima ............. 178/18.01 |
| 5,652,412 A * | 7/1997 | Lazzouni et al. ........ 178/18.01 |
| 5,661,506 A | 8/1997 | Lazzouni et al. ........... 345/179 |
| 5,805,282 A | 9/1998 | Prior et al. .................. 356/345 |
| 5,852,434 A | 12/1998 | Sekendur ..................... 345/179 |
| 5,929,420 A | 7/1999 | Cai ......................... 235/462.07 |
| 5,977,959 A | 11/1999 | Katsurahira et al. ........ 345/179 |
| 5,981,883 A | 11/1999 | Shriver ...................... 178/18.01 |
| 6,081,261 A * | 6/2000 | Wolff et al. ................. 345/179 |
| 6,188,392 B1 * | 2/2001 | O'Connor et al. ....... 178/18.01 |
| 6,330,057 B1 * | 12/2001 | Lederer et al. ............... 356/28 |

FOREIGN PATENT DOCUMENTS

| | | | | |
|---|---|---|---|---|
| EP | 0 737 843 A3 | 4/1996 | ............ G01B/9/02 |
| EP | 0 737 843 A2 | 4/1996 | ............ G01B/9/02 |
| EP | 0 838 776 A2 | 4/1998 | ............ G06K/11/18 |
| EP | 0 942 285 A1 | 3/1999 | ............ G01B/9/02 |
| EP | 0 942 286 A1 | 3/1999 | ............ G01B/9/02 |
| EP | 0 947 833 A1 | 3/1999 | ............ G01D/5/34 |
| JP | 08087368 A * | 8/1996 | |

* cited by examiner

*Primary Examiner*—Karl D. Frech
(74) *Attorney, Agent, or Firm*—John L. Rogitz

(57) ABSTRACT

A digital pen that has an ink writing tip includes a laser on a pen body that directs light toward paper across which the writing tip is stroked. A diffraction grating reflects a reference beam and passes a scattered beam from the substrate toward translation detectors, which consequently receive interference patterns of light. A processor receives the signals from the detectors, generates position signals, and stores the signals. Also, a bar code detector receives a bar code beam from the substrate, and a three dimensional force sensor outputs a signal representative of multidimensional forces applied to the pen. Subsequently, the signals are uploaded to a host processor which combines them to produce rotation-corrected relative positions (if no bar coded paper is used) or rotation-corrected absolute positions (if bar coded paper is used) that can be used to render alphanumeric characters or graphical representations.

24 Claims, 5 Drawing Sheets

DIGITAL PEN USING INTERFEROMETRY FOR RELATIVE AND ABSOLUTE PEN POSITION

BACKGROUND OF THE INVENTION

1. Field of the Invention

The present invention relates generally to handwriting data entry, and more particularly to methods and systems for facilitating data entry using a pen input device.

2. Description of the Related Art

Digital writing instruments, interchangeably referred to herein as "digital pens" regardless of whether they write in ink, can be used to capture pen strokes on paper and digitize them, so that the pen strokes can be converted by handwriting recognition software to a digitally-stored record of the writing. In this way, a laborious, tedious step in modern written communication, namely, the manual transcribing of handwriting into a computerized word processor, is eliminated, greatly increasing productivity.

Accordingly, digital pen systems can digitize pen strokes across a substrate, by sensing, in some fashion, the time-dependent position of the pen and converting the positions to pen strokes, for input of digital representations of the pen strokes to a handwriting recognition device. As recognized herein, magnetic-type systems can be used in which a special pen generates or alters a magnetic field as it is moved across a piece of paper, with the field being sensed by a special pad over which the paper is placed. Similarly, ultrasonic systems can be used in which a special pen generates or alters an ultrasonic signal as the pen is moved across a piece of paper, with the signal being sensed by a special pad over which the paper is placed.

Another type of pen input device has been developed by OTM Technologies Ltd. of Israel under the trade name "OTM" technology, which uses interference patterns generated by laser reflections from a substrate to track relative pen position. As recognized herein, the OTM technology does not contemplate absolute pen position tracking, such that if the pen is lifted from the substrate and placed back down to, e.g., cross a "t" or dot an "i", it is not known where the pen is placed, relative to where it was lifted off the substrate. This is undesirable from a user's viewpoint.

Moreover, since the pen tip must be used to write on the substrate, the laser cannot be placed right on the tip, but only nearby. This can create parallax between the tip, the position of which is desired, and the source of the light from which the position is actually derived. If a writer rotates the pen while leaving the tip in one place on the substrate, the parallax causes positional errors.

The present invention recognizes both of the above-noted problems and is directed to solving at least one of them.

SUMMARY OF THE INVENTION

A digital pen includes an elongated body defining a writing tip and a laser oriented on the body to direct light onto a substrate against which the writing tip can be positioned. A diffraction grating on the body reflects a reference beam and passes a scattered beam from the substrate, with these beams being received by at least one and preferably three translation detectors as interference patterns of light. Also, a bar code detector on the body receives a bar code beam from the substrate, and a processor receives signals from the detectors and stores them for later uploading to a host processor.

In a preferred embodiment, the processor is programmed to output position signals representative of positions of the pen. In addition to the light detectors, the pen body can support a force sensor that outputs a signal representative of multidimensional forces applied to the pen. A digital memory is supported by the body and it stores position and force signals from the processor, whereby the signals can be retrieved from the memory and processed by the host processor. Preferably, a filter circuit includes filtering structure to remove speckle contributions to the signal from the bar code detector.

In a preferred embodiment, the substrate includes optical codes known to the host processor. In this embodiment, the bar code detector outputs a signal in response to detecting an optical code, and the host processor combines data generated by the bar code detector with data generated by the translation detectors to render absolute pen positions. The processor further uses data from the force sensor to correct for pen rotation. In contrast, when the substrate does not include optical codes known to the host processor, the host processor combines data generated by the force sensor with data generated by the translation detectors to render rotation-corrected relative pen positions.

In another aspect, a digital pen includes an elongated body defining a writing tip. A laser is oriented on the body to direct light onto a substrate against which the writing tip can be positioned, and a diffraction grating reflects a reference beam and passes scattered beams from the substrate toward at least one translation detector. Also, a force sensor is supported by the body to output a signal representative of a force applied to the pen, including static, dynamic, and acceleration. A processor receives signals from the translation detector and force sensor.

In still another aspect, a host processor is disclosed for receiving from a digital pen bar code detector data, force sensor data, and translation detector data. The host processor includes logic means for determining whether a known bar code was sensed by the pen, and logic means for, if a known bar code was sensed by the pen, combining bar code detector data with the force sensor data and translation detector data to render absolute pen positions corrected for pen rotation. Also, the host processor includes logic means for, if a known bar code was not sensed by the pen, combining force sensor data and translation detector data to render relative pen positions corrected for pen rotation.

The details of the present invention, both as to its structure and operation, can best be understood in reference to the accompanying drawings, in which like reference numerals refer to like parts, and in which:

DETAILED DESCRIPTION OF THE PREFERRED EMBODIMENTS

Figure 1:
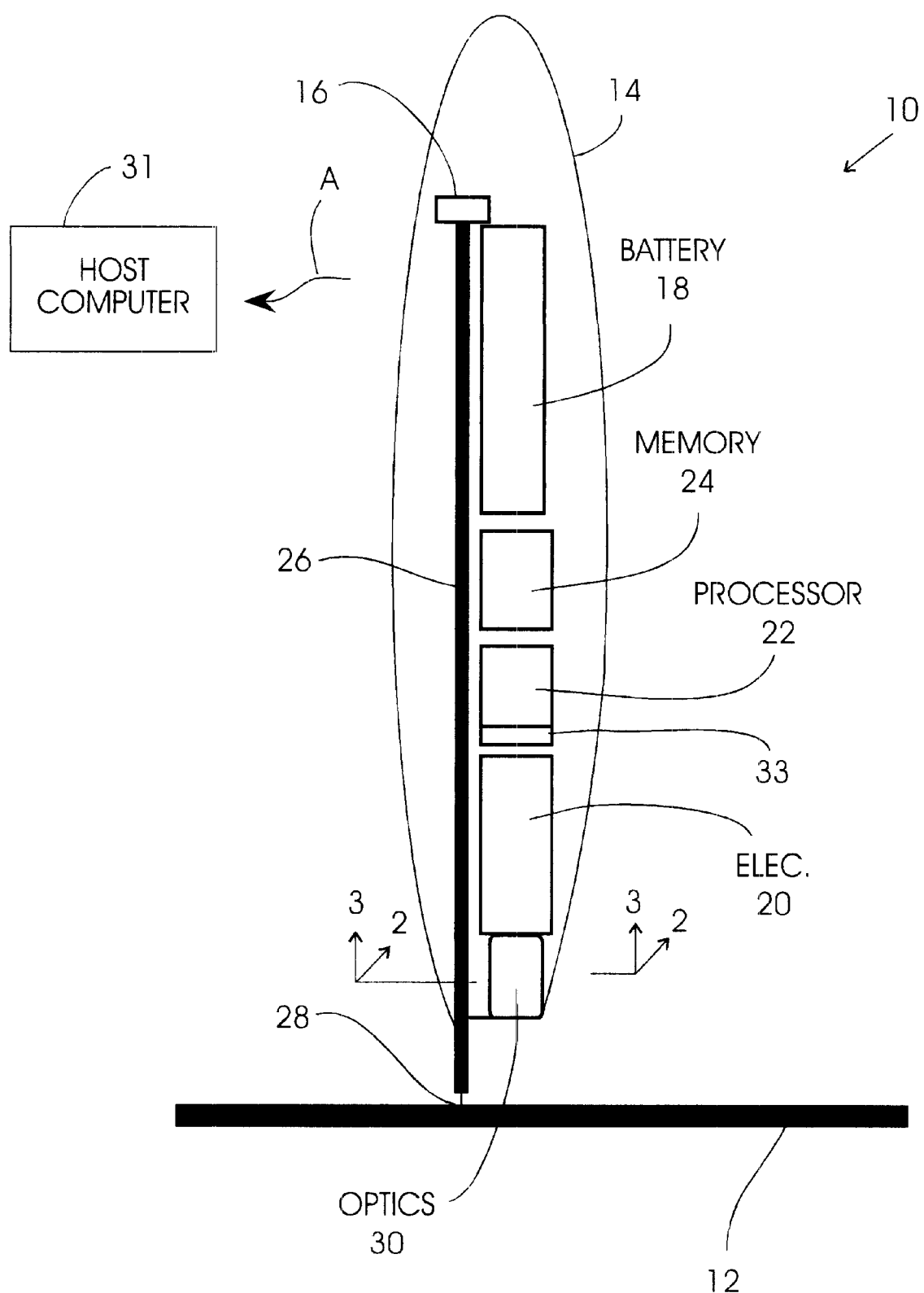
FIG. 1 is a side elevational view of the pen input system of the present invention.

Referring initially to FIG. 1, a pen input device is shown, generally designated 10, which includes a plain or more preferably bar-coded substrate 12 and at least one lightweight elongated hollow plastic or metal pen body 14. When a bar-coded substrate is used, visible, ultraviolet, or infrared absorbing, polarization selecting, fluorescing or reflecting lines representing the bar codes can be arranged to uniquely identify an absolute position in Cartesian coordinates on the substrate each, e.g., quarter inch, along with a page number and, in the case of forms, a field location. Moreover, as contemplated herein successive groups of bar codes can be orthogonal to each other, so that if one orientation is nearly parallel to the path of pen movement resulting in a poor read, the subsequent pattern will be more easily read.

The term "bar code" is a generic term for optical marks on a substrate that spatially encode digital information. The optical marks cause modulation of light that is detected by a detector which converts light intensity into an electrical signal to be processed and decoded into digital information. The preferred bar code is a matrix of one-dimensional bar codes. The digital information in a symbol is contained in the thickness and spacing of the elements. The encoding of digital information into one and two-dimensional bar codes is well known. A preferred encoding, is Code 128. Other embodiments include the Universal Product Code (UPS), Code 39, and Code 93.

The preferred embodiment set forth herein contemplates a pen body 14 that can be manipulated by a writer to write ink or graphite or other substance onto a substrate 12 such as paper, while digitally recording strokes across the substrate 12. It is to be understood, however, that the principles advanced herein can be used with a pen body 14 that is a stylus-type device that does not necessarily deposit ink or other substance onto a substrate and that is not elongated but rather is shaped like, e.g., a mouse.

A force sensor 16 can be supported on the pen body 14, for purposes to be shortly disclosed. In a preferred embodiment, the force sensor 16 is the sensor disclosed in co-pending U.S. patent application Ser. No. 08/735,482, filed Oct. 23, 1996, incorporated herein by reference. The force sensor 16 is any suitable device that measures the x, y, and z forces applied to the pen tip, and it and the other electrical components disclosure herein can be energized by a dc power supply 18, preferably a type AAA Nickel Metal Hydride rechargeable battery with voltage step-up electronics, with the signals from the contact sensor 16 being sent to signal processing electronics 20 that can include an analog to digital converter. Or, the power supply 18 could be an alkaline battery or other equivalent source. Digitized signals from the electronics 20 are sent to a digital processor 22, which processes the signals and stores pen position information in a digital memory 24. Signals stored in the memory 24 indicate the position of the tip 28 (which communicates with, e.g., an ink cartridge 26) based on light emissions from an optics package 30, such that the signals can be transferred to a host processor 31 as indicated by the arrow "A" for correlation of the position signals to graphical representations and/or to alpha-numeric characters using a handwriting recognition engine. The handwriting recognition engine can be any suitable handwriting recognition system, such as those disclosed in U.S. Pat. Nos. 5,644,652, 5,343,537, or 5,550,931, all owned by the present assignee and all incorporated herein by reference. The power supply 18, electronics 20, processor 22, and memory 24 are all mounted on the pen body 14 as shown.

Figure 2:
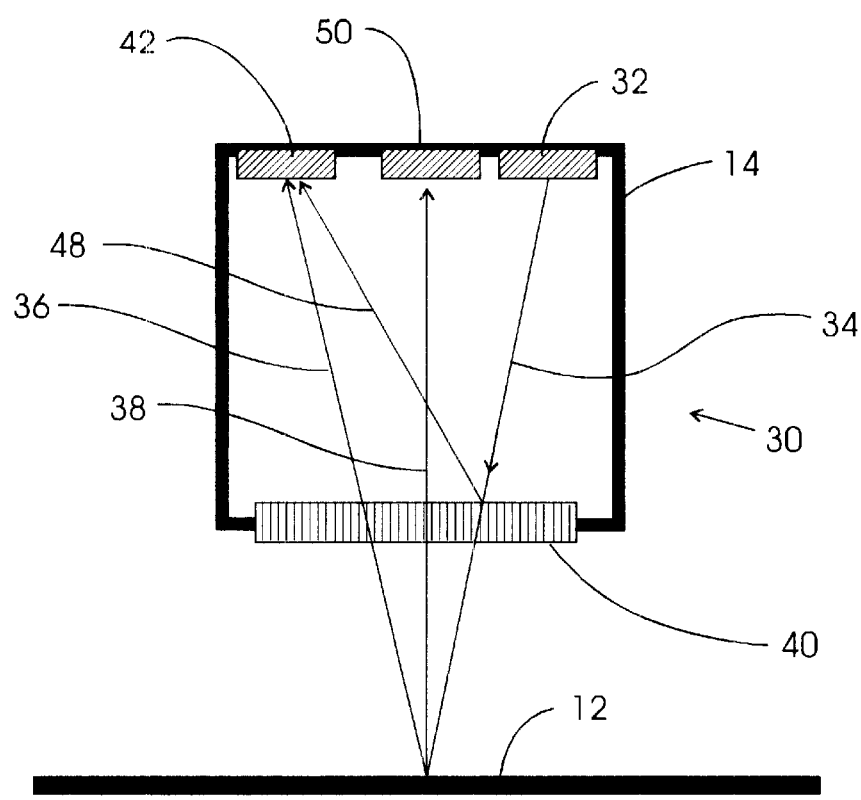
FIG. 2 is a schematic elevational view of the optics of the present invention as seen along the line 2—2 in FIG. 1.
Figure 3:
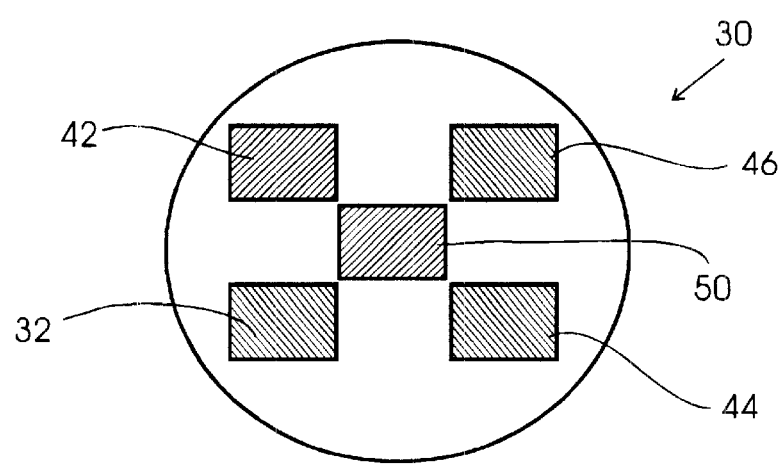
FIG. 3 is a schematic plan view of the optics of the present invention as seen along the line 3—3 in FIG. 1.

In accordance with the present invention, the power supply 18 also energizes a laser that is mounted on the body 14 in the optics package 30. More specifically, as shown in FIGS. 2 and 3 a laser 32, preferably an infrared (IR) laser, is mounted on the pen body 14. It is to be understood that the laser 32 is oriented on the body 14 such that it directs a primary laser beam 34 toward the vicinity of a distal writing tip 28 of the pen body 14, such that the coherent laser light scatters off the texture of the substrate 12 in many beams, with first and second reflected beams 36, 38 being shown for illustration. As contemplated hereunder, the reflected laser light passes back Up through a diffraction grating 40, with the first beam 36 being detected by at least one and preferably x/z, y/z, and x/y/z translation photodetectors 42, 44, 46, also mounted, in the preferred embodiment, on the body 14. As can best be appreciated in reference to FIG. 2, the translation photodetectors 42, 44, 46 also receive a reference beam 48 that diffracts off the grating 40, with the result being that the translation photodetectors 42, 44, 46 receive interference fringes.

On the other hand, a bar code photodetector 50 is mounted preferably centrally in the optics package 30 to detect the second reflected beam 38, for outputting signals that represent bar code elements when bar-coded paper is used as a substrate 12. The bar code detector 50 preferably is placed out of the path of the reference beam 48 to minimize the dc contribution to the bar code signal. As bar code elements which, in the preferred embodiment, absorb laser light, pass under the illumination spot, the intensity of the second beam 38 diminishes. Alternatively, the bar code elements can reflect or fluoresce light, in which case as bar code elements pass under the illumination spot, the intensity of the second beam 38 increases. In a less preferred embodiment, one of the translation photodetectors 42, 44, 46 can be used as the bar code detector, but such an embodiment would have a large, undesirable dc component in the signal.

Figure 4:
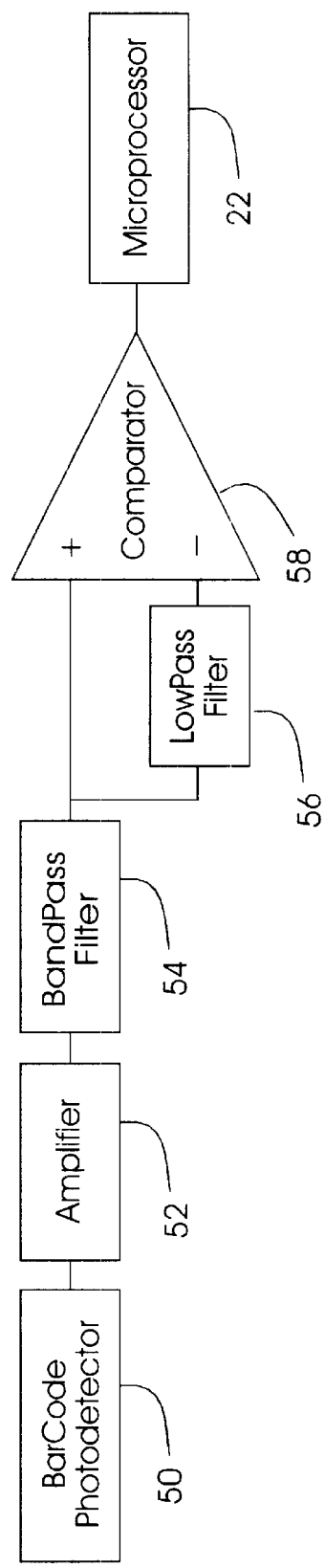
FIG. 4 is a block diagram of the signal processing circuit of the pen for the bar code photodetector.

In the preferred embodiment the photodetectors are CMOS photodiodes integrated on the same die as the analog signal processing components shown in FIG. 4. The signals from the photodetectors 42, 44, 46 are digitized by the ADC in the electronics 20 or by a separate ADC (not shown), with the digitized interference fringe signals then being sent to the processor 22.

In a particularly preferred embodiment, the photodetectors are fabricated on the same substrate as the electronics 20, the memory 24 is a four megabyte flash memory chip, the processor 22 is a Scenix 8 bit RISC processor chip, and the laser 32 is an infrared emitting vertical cavity surface emitting laser (VCSEL).

In accordance with the present invention, the processor 22 accesses a software or firmware position module 33 to correlate the signals from the electronics 20 to position signals representative of the position of the writing tip 28 relative to the substrate 12, in accordance with FIG. 5 below. These signals are then sent to the handwriting recognition engine mentioned above for reduction of the position signals to alpha-numeric characters and graphical representations. Alternatively, if used as a general purpose relative or absolute position pointing device, these signals can be used to move a cursor.

It is to be understood that the processor of the present invention can be a general purpose computer appropriate for its intended function and programmed to undertake appropriate method steps set forth herein. For example, the processor 22 can be a digital signal processor such as Analog Devices ADSP2104L, or a field programmable logic array such as a Xilinx XC2S39, or an ASIC. Alternatively, the processor 22, software module 33, and memory 24 can be located outside the pen body 14 and remotely linked to by radio waves, ultrasonic waves, IR link, or other remote means. The processor 22 and memory 24 can be included in a desktop computer, laptop computer such as a Thinkpad® made by International Business Machines Corporation (IBM) of Armonk, N.Y., or a personal digital assistant such as a 3COM Palm Pilot®, or a video game such as a Sony Playstation or Sega Dreamcast®.

It is to be further understood that the control components such as the software module 33 accessed by the processor 22 are executed by logic components such as are embodied in logic circuits on, e.g., an ASIC chip, or in software contained in an appropriate electronic data storage, e.g., read only memory (ROM), or hard disk drive and/or optical disk drive, or DASD array, magnetic tape, electronic read-only memory, or other appropriate data storage device that is conventionally coupled to the processor 22 for executing the present logic. For example, the control components can be embodied in a flash memory or one time programmable (OTP) memory.

The flow charts herein illustrate the structure of the present logic. Those skilled in the art will appreciate that the flow charts illustrate the structures of logic elements, such as computer program code elements or electronic logic circuits, that function according to this invention. Manifestly, the invention is practiced in its essential embodiment by a machine component that renders the logic elements in a form that instructs a digital processing apparatus (that is, a computer) to perform a sequence of function steps corresponding to those shown. In other words, the module 33 may be a computer program that is embodied in software or firmware and that is executed by a processor as a series of computer-executable instructions. In an illustrative embodiment of the invention, the computer-executable instructions may be lines of compiled C compatible code.

Now referring to FIG. 4, one preferred signal processing circuit of the electronics 20 can be seen. The signal from the bar code detector 50 is amplified by an amplifier 52 and then sent to a bandpass filter 54 to remove the contribution of so-called "optical speckles" from the signal. The filtered signal represents the instantaneous brightness of the second reflected beam 38. The signal is applied to a low pass filter 56 which produces a signal that represents the average intensity of the second beam 38. A comparator 58 receives the signals from both filters 54, 56 and outputs a digital "high" state when the instantaneous intensity exceeds the average brightness, indicating a light reflecting or fluorescing bar code element is under the illumination spot, and a "low" when the instantaneous intensity is lower than the average brightness, indicating a light absorbing bar code element is under the illumination spot.

Figure 5:
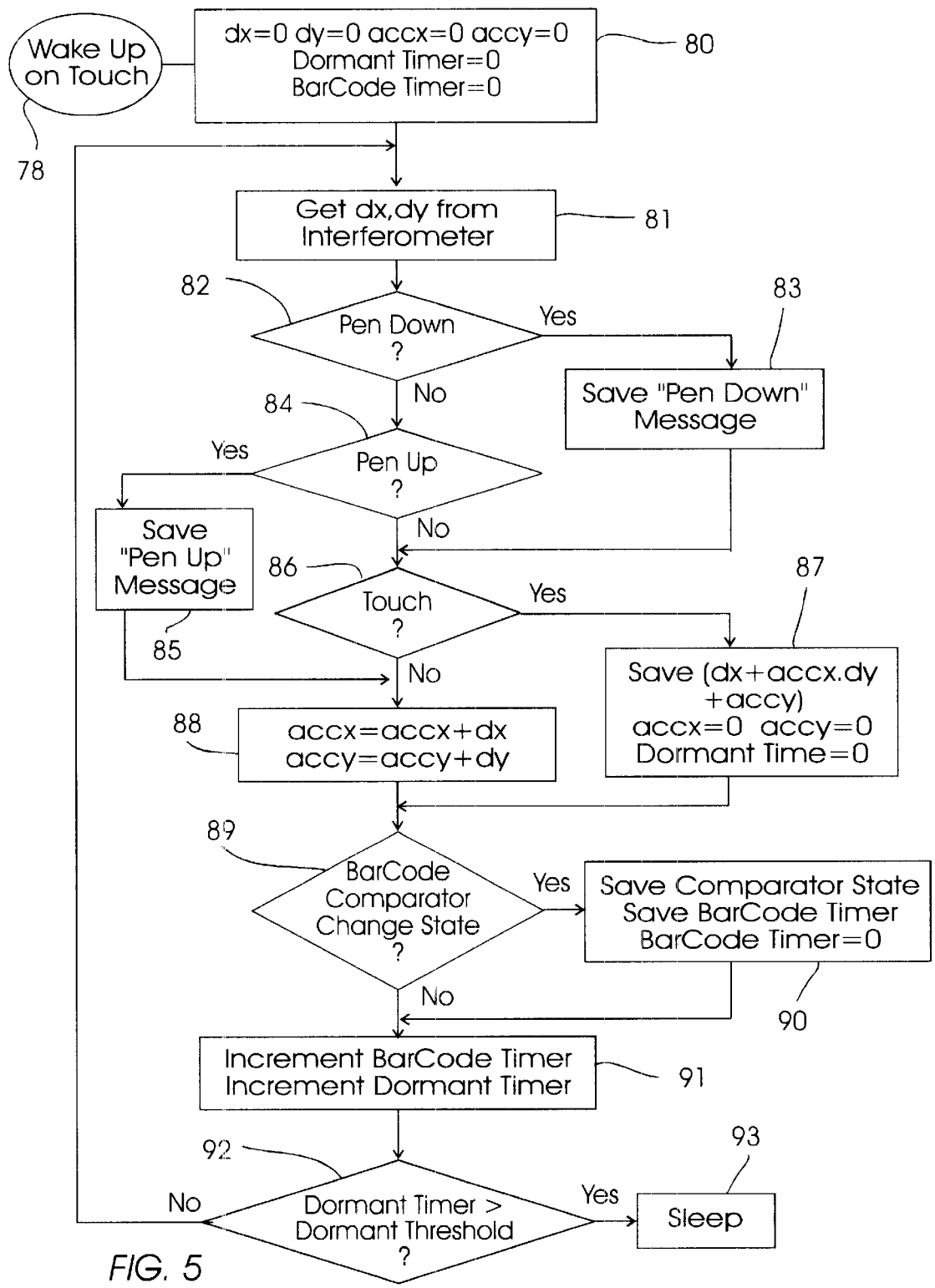
FIG. 5 is a flow chart of the pen logic.

Now referring to FIG. 5, the logic of the pen processor 22 can be seen. The logic starts at sleep state 78 and proceeds to block 80 when the pen 10 touches the substrate 12, as detected by the force sensor 16. At block 80 the incremental motion variables dx and dy are reset to zero, a Dormant Timer which counts the interval between touch activity, and a Barcode Timer which counts the interval between bar code states are reset to zero. The logic proceeds to the main loop where the incremental motion dx, dy is updated from the interferometer detector 30 in block 80. The method to determine incremental motion from the interferometer detector 30 is taught in one or more of the following references, incorporated herein by reference: "Interferometry: Encoder measures motion through interferometry" by Opher and Uri Kinrot in Laser Focus World Volume 36 Issue 3 March 2000: U.S. Pat. No. 5,805,282; European Patent Nos. EP00947833A1, EP00942286A1, EP00942285A1, EP00737843A3, EP00737843A2.

The logic moves to decision diamond 82 to determine whether the pen, if it was not in contact with the substrate 12 during the last frame, has just touched the substrate 12 during the current frame as indicated by signals from the force sensor 16. If so, a new touch is indicated, and the logic saves a "Pen Down" message along with a time stamp to the onboard memory 24 at block 83.

If the test at decision diamond 82 is negative the logic proceeds to decision diamond 84 to undertake the opposite test, i.e., to determine whether, if the pen had been in contact with the substrate 12 during the proceeding cycle, it is now no longer in contact. If this test is positive the logic saves a "Pen Up" message along with a time stamp to the onboard memory 24 at block 85. Of course, for a positive test at decision diamond 84, the test at decision diamond 86 is omitted, so that the logic flow from block 85 bypasses decision diamond 86.

When the pen is touching the substrate 12, decision diamond 86 is positive, and the accumulated position, calculated as the sum of the incremental movement dx, dy added to the accumulators accx, accy is stored in the onboard memory 24 at block 87, and the accumulators accx, accy are reset to zero. Also at block 87 the Dormant Timer is reset to zero, indicating that the pen is in use. If the pen was not touching the substrate 12, decision diamond 86 is negative, and the movement is accumulated by adding the incremental movement dx, dy to the accumulators accx, accy at block 88.

The logic moves to decision diamond 89 where the state of the Barcode comparator 58 is sampled. If the comparator 58 has chanced state since the preceding cycle, the comparator state and BarCode Timer are stored to onboard memory 24, at block 90, and the BarCode Timer is reset to zero. Following block 90, or if the decision diamond 89 is negative, the BarCode Timer and Interval Timer are incremented at block 91.

The dormant timer is tested at decision diamond 92 to see if an appreciable time has passed since the pen 10 has been touching the substrate 12. If positive, the laser pen processor 22 is put into sleep condition to conserve battery 18. The sleep condition includes turning off the laser 32. If decision diamond 92 is negative, the cycle repeats at block 81.

Figure 6:
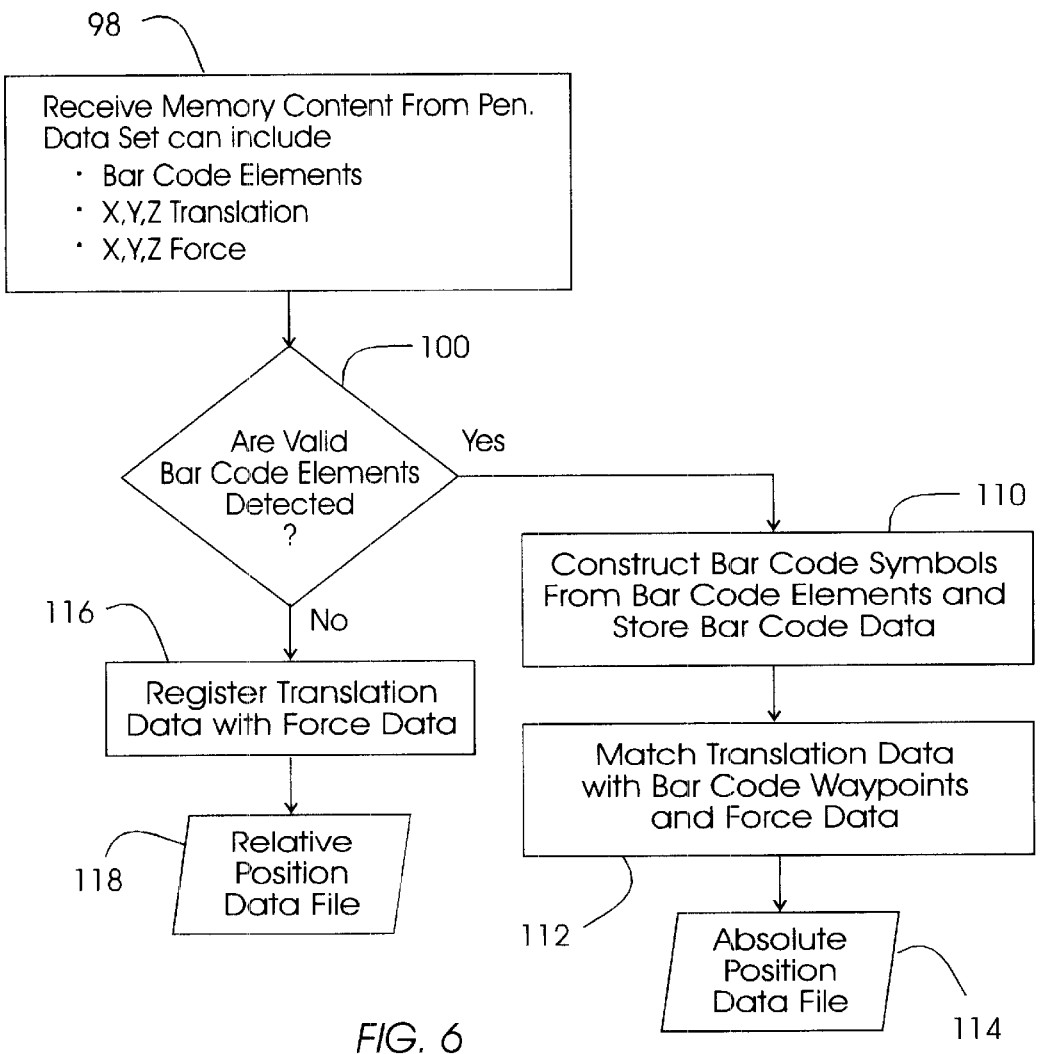
FIG. 6 is a flow chart of the data processing that is executed by a host processor which receives downloaded data from the pen.

Now referring to FIG. 6, the logic of the host processor 31 can be seen. Commencing at block 98, the content of the pen memory 24 is periodically uploaded to the host processor 31. As shown in FIG. 6, this memory content includes bar code element data, at least x and y and preferably also z translation data, and x, y, and z force data.

Proceeding to decision diamond 100, it is determined whether valid bar code elements are sensed by, e.g., looking up known bar codes and comparing it to the pattern generated by the comparator 58 of the pen. If so, the logic moves to block 110 to construct bar code symbols from the data and to store the bar code information. Constructing bar codes in this way can be undertaken using the principles set forth in, e.g., U.S. Pat. Nos. 5,414,252 and 5,929,420, both of which are incorporated herein by reference. Then, at block 112 the translation data is temporally matched and spatially registered to the absolute bar code positional data and, if desired, to the force sensor data (to correct for pen rotation between bar code waypoints). The result of this fusion of data is output at state 114 as a file of absolute pen positions that contains a time history of the absolute position trajectory of the pen, with pen tip pressure (from the z component of the force sensor 16) and page number. This file can be used to render digital copies of handwritten pages, to produce text translations using handwriting recognition techniques, transmit facsimiles of handwriting, undertake signature verification, and so on. The pressure data can be used to embellish the rendering and assist handwriting recognition and signature verification.

On the other hand, if no valid bar codes were sensed at decision diamond 100, the logic moves to block 116 to spatially register the translation data with the force sensor data to correct for pen rotation. Specifically, the x, y, and z forces measured by the force sensor 16 create a force vector, and the x, y translation direction determined from the translation data is rotated to line up with the x, y component of the force vector. The result of this fusion of data is output at state 118 as a relative pen position file with pen tip pressure (from the z component of the signal from the force sensor 16). It is to be understood that in the same way, absolute positions are corrected for pen rotation.

While the particular DIGITAL PEN USING INTERFEROMETRY FOR RELATIVE AND ABSOLUTE PEN POSITION as herein shown and described in detail is fully capable of attaining the above-described objects of the invention, it is to be understood that it is the presently preferred embodiment of the present invention and is thus representative of the subject matter which is broadly contemplated by the present invention, that the scope of the present invention fully encompasses other embodiments which may become obvious to those skilled in the art, and that the scope of the present invention is accordingly to be limited by nothing other than the appended claims, in which reference to an element in the singular means "at least one" unless otherwise recited. All structural and functional equivalents to the elements of the above-described preferred embodiment that are known to those of ordinary skill in the art are expressly incorporated herein by reference and are intended to be encompassed by the present claims.

We claim:

1. A hand held input device, comprising:
   a body;
   at least one laser oriented on the body to direct light onto a substrate against which the body can be positioned;
   at least one diffraction grating reflecting at least one reference beam and passing at least one reflected beam from the substrate;
   at least one translation detector receiving interference patterns of light generated by the combination of the reflected beam and the reference beam;
   at least one bar code detector receiving a bar code beam from the substrate; and
   a processor receiving signals from the detectors.

2. The device of claim 1, wherein the processor is programmed to output position signals representative of positions of the device.

3. The device of claim 1, further comprising, at least one force sensor supported by tile body, the force sensor outputting a signal representative of multidimensional forces applied to the device.

4. The device of claim 1, further comprising a digital memory supported by the body and storing position signals from the processor, whereby the position signals can be retrieved from the memory and processed by a host processor.

5. The device of claim 4, wherein the substrate includes optical codes known to the host processor, the codes representing at least positions, the bar code detector outputting at least one code signal in response to detecting an optical code.

6. The device of claim 5, wherein the host processor combines data generated by the bar code detector with data generated by the at least one translation detector to render absolute device positions.

7. The device of claim 6, wherein the processor further uses data from the force sensor to correct for device rotation.

8. The device of claim 4, wherein the substrate does not include optical codes known to the host processor and the host processor combines data generated by the force sensor with data generated by the at least one translation detector to render relative device positions.

9. The device of claim 1, further comprising a filter circuit including filtering structure to remove speckle contributions to the signal from the bar code detector.

10. The pen of claim 1, comprising at least three translation detectors.

11. The device of claim 1, wherein the bar code detector and at least one translation detector share the same photodetector.

12. A digital pen, comprising:
    an elongated body defining a writing tip;
    at least one laser oriented on the body to direct light onto a substrate against which the writing tip can be positioned;
    at least one diffraction grating reflecting at least one reference beam and passing at least one reflected beam from the substrate;
    at least one translation detector receiving interference patterns of light generated by the combination of the reflected beam and the reference beam;
    at least one force sensor supported by the body, the force sensor outputting a signal representative of a force acting on the pen; and
    a processor receiving signals from the translation detector and force sensor.

13. The pen of claim 12, wherein the processor is programmed to output position signals representative of positions of the pen.

14. The pen of claim 12, further comprising at least one bar code detector receiving a bar code beam from the substrate.

15. The pen of claim 14, further comprising a digital memory supported by the body and storing position signals from the processor, whereby the position signals can be retrieved from the memory and processed by a host processor.

16. The pen of claim 15, wherein the substrate includes optical codes known to the host processor, the codes representing at least positions, the bar code detector outputting at least one code signal in response to detecting an optical code.

17. The pen of claim 16, wherein the host processor combines data generated by the bar code detector with data generated by the at least one translation detector to render absolute pen positions.

18. The pen of claim 15, wherein the processor further uses data from the force sensor to correct for pen rotation.

19. The pen of claim 15, wherein the substrate does not include optical codes known to the host processor, and the host processor combines data generated by the force sensor with data generated by the at least one translation detector to render relative pen positions.

20. The pen of claim 14, further comprising a filter circuit including filtering structure to remove speckle contributions to the signal from the bar code detector.

21. The pen of claim 10, wherein the bar code detector and at least one translation detector share the same photodetector.

22. The pen of claim 12, comprising at least three translation detectors.

23. A host processor receiving from a digital pen bar code detector data, force sensor data, and translation detector data, and including logic comprising:

logic means for determining whether a known bar code was sensed by the pen;

logic means for, if a known bar code was sensed by the pen, combining bar code detector data with the force sensor data and translation detector data to render absolute pen positions corrected for pen rotation; and logic means for, if a known bar code was not sensed by the pen, combining force sensor data and translation detector data to render relative pen positions corrected for pen rotation.

24. The processor of claim 23, further comprising logic means for temporally matching bar code detector data with the force sensor data and translation detector data.

* * * * *